(12) United States Patent
Katsuramaki et al.

(10) Patent No.: US 12,240,393 B2
(45) Date of Patent: Mar. 4, 2025

(54) UNAUTHORIZED CONNECTION DETECTING DEVICE

(71) Applicant: YAZAKI CORPORATION, Tokyo (JP)

(72) Inventors: Takahiko Katsuramaki, Makinohara (JP); Taku Furuta, Makinohara (JP); Sadaharu Okuda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 74 days.

(21) Appl. No.: 17/837,037

(22) Filed: Jun. 10, 2022

(65) Prior Publication Data

US 2022/0396219 A1 Dec. 15, 2022

(30) Foreign Application Priority Data

Jun. 11, 2021 (JP) ................................. 2021-098227

(51) Int. Cl.
*G08G 1/01* (2006.01)
*B60R 16/023* (2006.01)
(Continued)

(52) U.S. Cl.
CPC .......... *B60R 16/023* (2013.01); *G06F 21/552* (2013.01); *G06F 21/85* (2013.01); *H01R 13/64* (2013.01); *G06F 2221/034* (2013.01)

(58) Field of Classification Search
CPC ..... B60R 16/023; G06F 21/552; G06F 21/85; G06F 2221/034; H01R 13/64
See application file for complete search history.

(56) References Cited

U.S. PATENT DOCUMENTS 2,928,063 A * 3/1960 Gammel, Sr. ........ H01R 12/721
439/329
3,702,464 A * 11/1972 Castrucci ................ H01L 27/00
257/679
(Continued)

FOREIGN PATENT DOCUMENTS

EP 1818859 A1 8/2007
EP 3 476 660 A1 5/2019
(Continued)

*Primary Examiner* — Quang Pham
(74) *Attorney, Agent, or Firm* — KENEALY VAIDYA LLP

(57) ABSTRACT

An unauthorized connection detecting device to detect an unauthorized device connection at a connection part at which an electronic control unit mounted on a vehicle and an input and output unit are connected to each other is provided. The unauthorized connection detecting device includes a pair of connectors having one connector mounted on the electronic control unit and another connector mounted on the input and output unit, the pair of connectors being to be attached to each other, a protrusion or a conductor pattern formed on the another connector, a switch unit arranged on the one connector and to detect the protrusion or a conductor connection detecting unit arranged on the one connector and to be electrically connected to the conductor pattern, and an unauthorized connection identification unit to detect an unauthorized connection based on a state detected by the switch unit or the conductor connection detecting unit.

6 Claims, 11 Drawing Sheets

(51) Int. Cl.
  *G06F 21/55* (2013.01)
  *G06F 21/85* (2013.01)
  *H01R 13/64* (2006.01)

(56) References Cited

U.S. PATENT DOCUMENTS

| | | | | |
|---|---|---|---|---|
| 3,885,850 | A * | 5/1975 | Witte | H01R 13/26 439/681 |
| 4,036,544 | A * | 7/1977 | Keglewitsch | H01R 13/41 439/861 |
| 4,131,851 | A * | 12/1978 | Martiny | H05K 7/02 381/5 |
| 4,166,667 | A * | 9/1979 | Griffin | H01R 12/58 439/873 |
| 4,184,735 | A * | 1/1980 | Ammon | H01R 13/428 439/747 |
| 4,368,942 | A * | 1/1983 | Mathe | H01R 13/64 439/680 |
| 4,580,868 | A * | 4/1986 | Verstijnen | H01R 13/6456 439/877 |
| 4,780,603 | A * | 10/1988 | Hamada | G06K 7/0021 361/752 |
| 4,787,860 | A * | 11/1988 | Bender | H01R 13/6275 439/680 |
| 4,789,352 | A * | 12/1988 | Kreinberg | H01R 12/88 439/157 |
| 4,909,742 | A * | 3/1990 | Ohkubo | G06K 19/07743 361/752 |
| 4,974,120 | A * | 11/1990 | Kodai | B29C 45/14647 361/783 |
| 4,976,630 | A * | 12/1990 | Schuder | G06K 7/0026 439/328 |
| 5,016,086 | A * | 5/1991 | Inoue | G06K 19/07743 257/730 |
| 5,036,430 | A * | 7/1991 | Hills | H05K 5/0286 235/492 |
| 5,044,994 | A * | 9/1991 | Van Woensel | H01R 13/6456 439/681 |
| 5,144,586 | A * | 9/1992 | Faraci | G11C 5/00 365/63 |
| 5,155,663 | A * | 10/1992 | Harase | G06K 19/07732 361/740 |
| 5,157,244 | A * | 10/1992 | Mroczkowski | G06K 7/0047 235/441 |
| RE34,190 | E * | 3/1993 | Rubinstein | H01R 12/62 439/260 |
| 5,231,274 | A * | 7/1993 | Reynier | G07F 7/00 235/441 |
| 5,513,999 | A | 5/1996 | Fry et al. | |
| 5,562,504 | A * | 10/1996 | Moshayedi | H01R 31/005 439/131 |
| 5,660,568 | A * | 8/1997 | Moshayedi | G06K 19/07743 439/945 |
| 5,667,408 | A * | 9/1997 | Broschard, III | G06K 7/0069 439/260 |
| 5,750,973 | A * | 5/1998 | Kaufman | G06K 7/0021 235/441 |
| 5,795,174 | A * | 8/1998 | Saito | H01R 13/518 439/310 |
| 5,860,816 | A * | 1/1999 | Provencher | H01R 13/7195 439/701 |
| 5,879,194 | A * | 3/1999 | Thenaisie | H01R 13/633 439/607.53 |
| 5,888,624 | A * | 3/1999 | Haghiri | G06K 19/077 428/209 |
| 5,921,808 | A * | 7/1999 | Haftmann | H01R 12/772 439/495 |
| 5,961,350 | A * | 10/1999 | Shiu | H01R 12/7017 439/108 |
| 5,969,331 | A * | 10/1999 | Hoolhorst | G06K 7/0021 235/475 |
| 6,027,345 | A * | 2/2000 | McHugh | H01R 13/6585 439/74 |
| 6,109,939 | A * | 8/2000 | Kondo | G06K 19/07739 439/140 |
| 6,129,575 | A * | 10/2000 | Daoud | H01R 13/5213 439/587 |
| 6,129,577 | A * | 10/2000 | Daoud | H01R 13/7032 439/272 |
| 6,149,447 | A * | 11/2000 | Maeda | H01R 13/518 439/157 |
| 6,241,539 | B1 * | 6/2001 | Sato | H01R 13/193 439/157 |
| 6,244,902 | B1 * | 6/2001 | McDowell | G06K 7/0021 439/630 |
| 6,280,236 | B1 * | 8/2001 | Daoud | G01R 31/69 439/948 |
| 6,283,376 | B1 * | 9/2001 | Schuder | G06K 7/0021 361/737 |
| 6,293,815 | B1 * | 9/2001 | Daoud | H01R 13/501 439/426 |
| 6,302,725 | B1 * | 10/2001 | Daoud | G01R 1/0408 439/482 |
| 6,302,744 | B1 * | 10/2001 | Nomura | H01R 13/64 439/680 |
| 6,340,306 | B1 * | 1/2002 | Daoud | H01R 13/6273 439/219 |
| D454,875 | S * | 3/2002 | McDowell | D14/385 |
| D456,407 | S * | 4/2002 | McDowell | D14/385 |
| 6,373,259 | B1 * | 4/2002 | Daoud | H04Q 1/023 439/426 |
| 6,394,842 | B1 * | 5/2002 | Sakurai | H01R 13/6583 439/607.25 |
| 6,443,751 | B1 * | 9/2002 | Pan | H01R 13/2442 439/345 |
| 6,491,227 | B2 * | 12/2002 | Izumi | G06K 13/08 235/475 |
| 6,508,673 | B2 * | 1/2003 | McDowell | G06K 7/0021 235/441 |
| 6,511,350 | B1 * | 1/2003 | Ito | G06K 7/0021 439/377 |
| 6,540,560 | B1 * | 4/2003 | Ito | H01R 13/2442 439/64 |
| 6,607,404 | B1 * | 8/2003 | Ito | H01R 13/64 439/680 |
| 6,648,694 | B2 * | 11/2003 | Takamori | H01R 12/722 439/630 |
| 6,666,724 | B1 * | 12/2003 | Lwee | G06K 7/0043 439/138 |
| 6,669,512 | B2 * | 12/2003 | Lee | G06K 13/08 439/680 |
| 6,699,061 | B2 * | 3/2004 | Abe | H01R 13/64 439/377 |
| 6,729,548 | B2 * | 5/2004 | Kondo | G06K 13/0856 235/441 |
| 6,796,846 | B2 * | 9/2004 | Roudot | H01R 13/6315 439/674 |
| 6,799,724 | B2 * | 10/2004 | Shimada | G06K 13/08 235/492 |
| 6,837,749 | B2 * | 1/2005 | Miyazawa | G06K 13/0825 439/680 |
| 6,851,959 | B2 * | 2/2005 | Ooya | G06K 13/06 439/159 |
| 6,875,057 | B2 * | 4/2005 | Miyazawa | G06K 7/0047 439/946 |
| 6,890,220 | B2 * | 5/2005 | Wang | H01R 13/64 439/680 |
| 6,896,555 | B1 * | 5/2005 | Su | G06K 13/0825 439/630 |
| 6,900,982 | B2 * | 5/2005 | Chang | G06F 1/182 235/441 |
| 6,908,321 | B1 * | 6/2005 | Lai | H01R 27/00 439/140 |
| 6,948,949 | B1 * | 9/2005 | Schwartz | H01R 9/2491 439/76.1 |
| 6,974,350 | B1 * | 12/2005 | Chen | H01R 27/00 439/541.5 |
| 6,991,479 | B2 * | 1/2006 | Miao | H01R 13/6397 439/352 |

(56) References Cited

U.S. PATENT DOCUMENTS

| | | | | |
|---|---|---|---|---|
| 7,011,549 B1* | 3/2006 | Lai | ......................... | H01R 27/00 439/630 |
| 7,044,798 B2* | 5/2006 | Takei | ......................... | H01R 9/16 439/630 |
| 7,048,588 B2* | 5/2006 | Chang | ................ | G06K 13/0825 439/630 |
| 7,056,149 B1* | 6/2006 | Lanni | ......................... | H01R 13/641 439/680 |
| 7,083,440 B2* | 8/2006 | Shen | ......................... | H01R 27/00 439/138 |
| 7,083,473 B1* | 8/2006 | Lai | ......................... | H01R 13/64 439/630 |
| 7,108,557 B2* | 9/2006 | Kikuchi | ............... | H01R 13/635 439/946 |
| 7,112,095 B2* | 9/2006 | Shen | ......................... | G06K 7/0043 439/138 |
| 7,117,590 B2* | 10/2006 | Koenig | ............. | H01R 13/6271 29/842 |
| 7,118,420 B1* | 10/2006 | Lai | ......................... | H01R 25/006 439/946 |
| 7,182,645 B2* | 2/2007 | Shimizu | ............. | G06K 7/0073 439/157 |
| 7,198,519 B2* | 4/2007 | Regnier | ............... | H01R 12/725 439/680 |
| 7,214,076 B1* | 5/2007 | Sabo | ................. | H01R 13/4536 439/138 |
| 7,238,052 B2* | 7/2007 | Wang | ..................... | G06K 13/08 439/630 |
| 7,267,561 B2* | 9/2007 | Lai | ......................... | H01R 13/64 439/138 |
| 7,309,259 B2* | 12/2007 | Sun | ..................... | G06K 13/0875 439/630 |
| 7,320,621 B2* | 1/2008 | Laurx | ................. | H01R 12/712 439/607.11 |
| 7,326,085 B2* | 2/2008 | Takai | ..................... | G06K 7/0034 439/138 |
| 7,341,494 B2* | 3/2008 | Wang | ..................... | H01R 13/64 439/83 |
| 7,352,285 B2* | 4/2008 | Sakama | ............... | H01R 13/641 340/572.1 |
| 7,357,653 B2* | 4/2008 | Hung | ..................... | H01R 13/64 439/138 |
| 7,364,820 B2* | 4/2008 | Tanaka | ................ | G06K 7/0021 439/633 |
| 7,377,814 B2* | 5/2008 | Shen | ..................... | G06K 7/0073 439/630 |
| 7,431,595 B1* | 10/2008 | Yen | ......................... | H01R 27/00 439/138 |
| 7,438,598 B1* | 10/2008 | Ito | ......................... | H01R 12/721 439/218 |
| 7,448,912 B1* | 11/2008 | Shiue | ................. | G06K 7/0034 439/946 |
| 7,462,045 B1* | 12/2008 | Lee | .................... | H01R 13/6397 439/304 |
| 7,611,056 B2* | 11/2009 | Sato | ..................... | G06K 7/0043 235/441 |
| 7,621,783 B1* | 11/2009 | Lai | ......................... | H01R 27/00 439/630 |
| 7,628,624 B2* | 12/2009 | Ye | ......................... | H01R 27/00 439/946 |
| 7,632,151 B2* | 12/2009 | Wang | ..................... | G06K 7/0021 439/377 |
| 7,686,659 B2* | 3/2010 | Peng | ..................... | H01R 12/725 439/680 |
| 7,713,083 B1* | 5/2010 | Sun | ......................... | H01H 25/002 439/507 |
| 7,771,231 B2* | 8/2010 | Kim | ..................... | G06K 7/0043 439/541.5 |
| 7,819,678 B2* | 10/2010 | Ye | ..................... | G06K 13/08 439/159 |
| 7,833,063 B2* | 11/2010 | Matsumoto | ........... | G06K 7/0043 439/630 |
| 7,867,034 B1* | 1/2011 | Sato | ..................... | G06K 7/0043 439/159 |
| 7,874,857 B2* | 1/2011 | Takei | ..................... | H01R 13/64 439/218 |
| D632,298 S * | 2/2011 | DePaula | ..................... | D14/436 |
| 8,011,950 B2* | 9/2011 | McGrath | ........... | H01R 13/6594 439/497 |
| D647,901 S * | 11/2011 | Lin | ......................... | D14/356 |
| 8,047,443 B2* | 11/2011 | DePaula | ............. | H05K 5/0278 235/487 |
| 8,061,608 B2* | 11/2011 | Liao | ................ | G06K 19/07741 235/441 |
| 8,177,564 B1* | 5/2012 | Ito | ..................... | H01R 13/6471 439/108 |
| 8,184,974 B2* | 5/2012 | Cline | ..................... | H04N 7/22 370/254 |
| 8,330,655 B2* | 12/2012 | Zadesky | ............... | H01Q 1/22 343/702 |
| 8,369,082 B2* | 2/2013 | Madonna | ............. | G06F 1/1632 361/679.56 |
| 8,491,339 B2* | 7/2013 | Matsumoto | ........... | H01R 31/06 439/630 |
| 8,561,910 B2* | 10/2013 | DePaula | ............. | G11C 13/0069 235/492 |
| 8,915,758 B2* | 12/2014 | Shishikura | ........... | H01R 13/514 439/701 |
| 9,142,927 B2* | 9/2015 | Tseng | ..................... | H01R 31/06 |
| 9,257,788 B1* | 2/2016 | Jia | ........................... | G06F 1/187 |
| 9,477,921 B2* | 10/2016 | Troeger | ............. | H01R 13/6691 |
| 9,520,675 B2* | 12/2016 | Choi | ..................... | H01R 13/641 |
| 9,570,821 B2* | 2/2017 | Yamakami | ........... | H01R 12/515 |
| 9,627,808 B2* | 4/2017 | Bonucci | ............. | H01R 13/6273 |
| 9,627,813 B1* | 4/2017 | Wu | ..................... | H01R 12/721 |
| 9,749,048 B2* | 8/2017 | Kishima | ............. | G02B 6/4279 |
| 9,972,937 B2* | 5/2018 | Akagi | ..................... | H01R 13/516 |
| 10,135,191 B1* | 11/2018 | Ahn | ..................... | G06F 21/74 |
| 10,136,196 B2* | 11/2018 | Ritter | ..................... | H04Q 1/15 |
| 10,306,797 B2* | 5/2019 | Sakalkar | ............. | H05K 7/1498 |
| 10,348,030 B1* | 7/2019 | Lin | ..................... | H01R 13/64 |
| 10,355,382 B2* | 7/2019 | Sato | ..................... | H01R 12/721 |
| 10,404,322 B2* | 9/2019 | Sakalkar | ............. | H04B 3/542 |
| 10,492,329 B2* | 11/2019 | Sakalkar | ............. | H05K 7/1497 |
| 10,632,519 B2* | 4/2020 | Wen | ..................... | H01R 13/50 |
| 10,678,001 B2* | 6/2020 | Smrha | ..................... | G02B 6/4452 |
| 10,763,605 B2* | 9/2020 | Gieski | ..................... | H01R 43/205 |
| 10,797,420 B2* | 10/2020 | Maesoba | ............. | H01R 12/58 |
| 10,840,687 B1* | 11/2020 | Elberbaum | ........... | H04B 10/29 |
| 10,855,028 B1* | 12/2020 | Henry | ................. | H01R 13/6272 |
| 11,050,198 B1* | 6/2021 | Cheng | ..................... | H01R 13/665 |
| 11,088,488 B2* | 8/2021 | Yasuda | ............... | H01R 13/4538 |
| 11,139,624 B2* | 10/2021 | Miyamura | ........... | H01R 24/64 |
| 11,374,361 B2* | 6/2022 | Minoru | ............... | H01R 13/6471 |
| 11,411,355 B2* | 8/2022 | Lv | ..................... | H01R 13/506 |
| 11,431,131 B2* | 8/2022 | Lv | ..................... | H01R 13/6582 |
| 11,575,231 B2* | 2/2023 | Lv | ..................... | H01R 13/502 |
| 11,616,326 B1* | 3/2023 | Wall | ..................... | H01R 13/6215 439/680 |
| 11,637,390 B2* | 4/2023 | Zerebilov | ............. | H01R 12/724 439/607.2 |
| 11,670,879 B2* | 6/2023 | Zerebilov | ............. | H01R 12/53 439/78 |
| 11,677,188 B2* | 6/2023 | Diaz | ..................... | H01R 13/6591 439/108 |
| 11,715,922 B2* | 8/2023 | Winey | ..................... | H01R 12/75 439/78 |
| 11,735,852 B2* | 8/2023 | Cartier, Jr. | ........... | H01R 12/775 439/77 |
| D997,880 S * | 9/2023 | Gieski | ..................... | D13/147 |
| 11,824,311 B2* | 11/2023 | Gailus | ..................... | H01R 13/6477 |
| 12,051,864 B2* | 7/2024 | Miller | ..................... | H05K 7/1438 |
| 2001/0010984 A1* | 8/2001 | Bricaud | ............... | H01R 12/714 439/74 |
| 2004/0106330 A1* | 6/2004 | Mase | ..................... | H01R 13/506 439/695 |
| 2004/0157501 A1* | 8/2004 | Torii | ................. | H01R 13/4367 439/752 |

(56) References Cited

U.S. PATENT DOCUMENTS

| | | | |
|---|---|---|---|
| 2004/0259395 A1* | 12/2004 | Yang | H01R 13/64 439/79 |
| 2004/0259426 A1* | 12/2004 | Chang | G06K 13/0825 439/677 |
| 2005/0146347 A1* | 7/2005 | Yevmenenko | H05K 1/0266 324/750.01 |
| 2006/0049942 A1* | 3/2006 | Sakama | G06K 19/07758 340/572.1 |
| 2006/0079132 A1* | 4/2006 | Ko | G06K 7/0021 439/630 |
| 2006/0172572 A1* | 8/2006 | Matsukawa | H01R 13/635 439/159 |
| 2007/0140643 A1* | 6/2007 | Daikuhara | G02B 6/4246 385/147 |
| 2008/0305692 A1* | 12/2008 | Little | H01R 13/6658 439/676 |
| 2009/0095609 A1* | 4/2009 | Ruff | H01H 1/36 200/329 |
| 2009/0137139 A1* | 5/2009 | Shiue | H01R 13/64 439/160 |
| 2010/0052863 A1* | 3/2010 | Renfro, Jr. | G02B 6/4292 398/9 |
| 2010/0138581 A1* | 6/2010 | Bird | H04L 65/60 710/303 |
| 2011/0195592 A1* | 8/2011 | McGrath | H01R 13/6474 439/607.41 |
| 2011/0318967 A1* | 12/2011 | Yoshida | G06K 7/003 439/629 |
| 2012/0231650 A1* | 9/2012 | Tian | G06K 7/0021 439/374 |
| 2012/0287343 A1* | 11/2012 | Kelly | G06F 3/1438 348/554 |
| 2012/0329306 A1* | 12/2012 | Little | G06K 7/0021 439/367 |
| 2013/0264107 A1* | 10/2013 | Meyers | H01R 13/6466 174/268 |
| 2014/0127921 A1* | 5/2014 | Shimizu | H01R 13/62938 439/157 |
| 2014/0199874 A1* | 7/2014 | Tseng | H01R 13/641 439/345 |
| 2014/0302706 A1* | 10/2014 | YuQiang | H01R 13/64 439/378 |
| 2016/0211604 A1* | 7/2016 | Matsuura | H01R 13/64 |
| 2016/0308311 A1* | 10/2016 | Hori | H01R 12/91 |
| 2017/0182957 A1* | 6/2017 | Watson | H04L 67/125 |
| 2018/0138628 A1* | 5/2018 | Matsumoto | H01R 13/64 |
| 2018/0233861 A1* | 8/2018 | Golko | H01R 13/6683 |
| 2018/0236953 A1 | 8/2018 | Nakura | |
| 2018/0248303 A1* | 8/2018 | Masui | H01R 13/64 |
| 2020/0028300 A1* | 1/2020 | Huang | G06F 1/1632 |
| 2020/0156793 A1* | 5/2020 | Galipeau | H04N 21/44218 |
| 2020/0194942 A1 | 6/2020 | Pink et al. | |
| 2020/0221968 A1* | 7/2020 | Gumiero | A61B 5/282 |
| 2020/0371697 A1* | 11/2020 | Kao | G11C 16/22 |
| 2021/0062828 A1* | 3/2021 | Hong | F04D 29/646 |

FOREIGN PATENT DOCUMENTS

| | | |
|---|---|---|
| EP | 3 659 850 A1 | 6/2020 |
| JP | H11-312557 A | 11/1999 |
| JP | 2001326033 A * | 11/2001 |
| JP | 2002-75564 A | 3/2002 |
| JP | 2004-152543 A | 5/2004 |
| JP | 2008-153852 A | 7/2008 |
| JP | 2014-143631 A | 8/2014 |
| WO | 2017/029968 A1 | 2/2017 |

* cited by examiner

UNAUTHORIZED CONNECTION DETECTING DEVICE

CROSS-REFERENCE TO RELATED APPLICATION

The present application claims priority to Japanese Patent Application No. 2021-098227 filed on Jun. 11, 2021, the entire content of which is incorporated herein by reference.

TECHNICAL FIELD

The presently disclosed subject matter relates to an unauthorized connection detecting device configured to detect an unauthorized device connection on a vehicle.

BACKGROUND

A user of a vehicle, a vehicle dealer, or the like may retrofit various optional devices prepared in advance to a vehicle, or may replace various devices according to preference of the user. Therefore, wire harnesses and various electronic control units (ECUs) are often provided with connectors for connecting the retrofit devices in advance, so that the user, the vehicle dealer, or the like can retrofit various devices to the vehicle.

However, an unauthorized device may be connected to the connector on the vehicle side. Such an unauthorized device may cause a malfunction in operation of the vehicle, increase a risk of vehicle theft, or lead to leakage of various information existing on the vehicle side. Therefore, it is necessary to detect the unauthorized connected device on the vehicle side.

An unauthorized connection detecting method and an unauthorized connection detecting system in the related art appropriately determine presence or absence of tool connection while sharing a communication line for determining the presence or absence of the tool connection with a normal communication line (see, for example, JP2014-143631A). Specifically, a monitor system that performs differential communication between a window electronic control unit and a monitor tool via a pair of communication lines includes a first step of applying a predetermined voltage to at least one of the pair of communication lines when the window electronic control unit and the legitimate monitor tool are connected to each other via the pair of communication lines, a second step of detecting a voltage generated in at least one of the pair of communication lines and a third step of determining whether or not the legitimate monitor tool is connected to the window electronic control unit via the pair of communication lines based on the voltage generated in at least one of the pair of communication lines detected in the second step.

Another related art discloses a technique of providing a pair of connectors that should be attached to each other and is capable of identifying each other and being individually managed, so as to implement a highly secure vehicle anti-theft system using the connectors (see, for example, JP2004-152543A). Specifically, the connector for electrically connecting a plurality of members is formed with a built-in tag chip. The tag chip is configured to include a storage unit that stores information and an antenna that transmits information wirelessly, so that information can be exchanged with an outside regardless of electrical connection by the connector. A range of the wireless information transmission is limited to a range of approximately several mm to prevent information leakage.

However, the former related art cannot be used when connecting a device that does not include a communication line to the connector on the vehicle side since it is indispensable to use a communication line to detect the unauthorized device connection.

When using the latter related art, the tag chip using a radio frequency identifier (RFID) is used, and thus an RFID reader that reads information from the tag chip of the connector is required, and a configuration of the ECU on the vehicle side is complicated and a cost goes up.

SUMMARY

Illustrative aspects of the presently disclosed subject matter provide an unauthorized connection detecting device capable of detecting unauthorized device connection at a low cost when a device that does not include a communication line is connected to an ECU or the like on a vehicle side.

According to an illustrative aspect of the presently disclosed subject matter, an unauthorized connection detecting device configured to detect an unauthorized device connection at a connection part at which an electronic control unit mounted on a vehicle and an input and output unit are connected to each other is provided. The unauthorized connection detecting device includes a first connector mounted on the electronic control unit and a second connector mounted on the input and output unit, the first and second connectors being configured to be attached to each other, a protrusion formed on the second connector, a switch unit arranged on the first connector and configured to, when the first and second connectors are attached to each other, detect the protrusion and an unauthorized connection identification unit configured to detect an unauthorized connection based on a state detected by the switch unit. According to another illustrative aspect of the presently disclosed subject matter, an unauthorized connection detecting device configured to detect an unauthorized device connection at a connection part at which an electronic control unit mounted on a vehicle and an input and output unit are connected to each other, the unauthorized connection detecting device includes a third connector mounted on the electronic control unit and a fourth connector mounted on the input and output unit, the third and fourth connectors being configured to be attached to each other, a conductor pattern formed on the fourth connector, a conductor connection detecting unit arranged on the third connector and configured to be electrically connected to the conductor pattern and an unauthorized connection identification unit configured to detect an unauthorized connection based on a state detected by the conductor connection detecting unit.

Other aspects and advantages of the presently disclosed subject matter will be apparent from the following description, the drawings and the claims.

DESCRIPTION OF EMBODIMENTS

A specific embodiment according to the presently disclosed subject matter will be described below with reference to the drawings.

Figure 1:
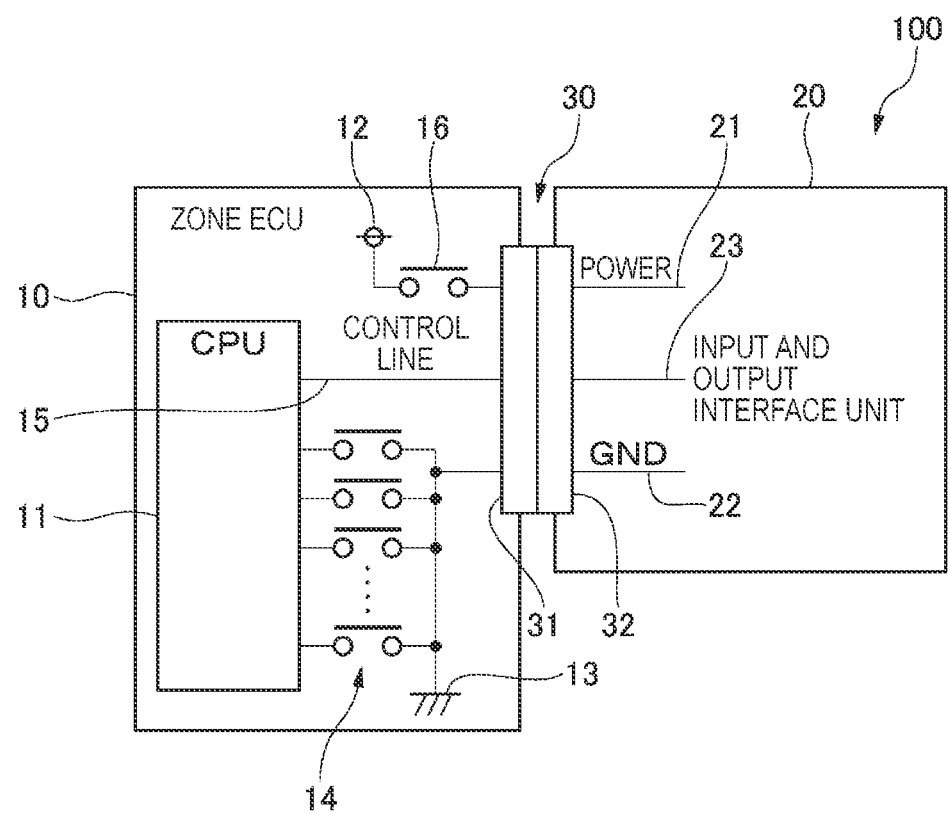
FIG. 1 is an electric circuit diagram showing a configuration example of an unauthorized connection detecting device according to an embodiment of the presently disclosed subject matter.

FIG. 1 is an electric circuit diagram showing a configuration example of an unauthorized connection detecting device 100 according to the embodiment of the presently disclosed subject matter. The unauthorized connection detecting device 100 shown in FIG. 1 is mounted on a vehicle and has a function for preventing some unauthorized unit from being connected to a legitimate in-vehicle unit.

A zone ECU 10 is a legitimate unit prepared for managing a predetermined zone on the vehicle, and is equipped with a microcomputer (CPU) 11 and a communication function as any ECUs generally have. The zone ECU 10 has a function for supplying power of the vehicle side to devices in a managed zone and a function for inputting and outputting a predetermined signal. Zones may be assigned by divisions of various areas in a space of the vehicle, or may be assigned by classifications of functions.

An input and output interface unit 20 is a legitimate unit prepared in advance, and is an in-vehicle device having a function of inputting or outputting signals to or from the zone ECU 10. However, in the present embodiment, since the input and output interface unit 20 is not equipped with a computer or a communication function, the zone ECU 10 cannot acquire a state on the input and output interface unit 20 side via a communication function. Therefore, the zone ECU 10 of the present embodiment detects that some unauthorized unit, instead of the input and output interface unit 20, is connected to the zone ECU 10 at a unit connection portion 30 without using any communication function.

The zone ECU 10 and the input and output interface unit 20 are physically and electrically connected via the unit connection portion 30. The unit connection portion 30 includes a connector 31 mounted on the zone ECU 10 side and a connector 32 mounted on the input and output interface unit 20 side. In the present embodiment, the connector 31 is a male type and the connector 32 is a female type, and the two connectors can be fitted to and combined to or separated from each other by insertion and removal operations to both.

The zone ECU 10 includes one or more control lines 15. The control line 15 is used for outputting a predetermined control signal from a microcomputer 11 to the input and output interface unit 20 side and inputting an input signal from the input and output interface unit 20 side to the microcomputer 11.

The unit connection portion 30 has a power line and ground wire connection function in addition to a connection function of the control line 15. In the zone ECU 10, a power line of the connector 31 is connected to a power line 12 via a power control switch 16. A ground wire of the connector 31 is connected to a ground 13 in the zone ECU 10.

A switch unit 14 is connected to the ground 13 of the zone ECU 10. The switch unit 14 includes a plurality of independent electric contacts incorporated inside the connector 31, which will be described later. A plurality of input ports of the microcomputer 11 are connected to the switch unit 14. The microcomputer 11 uses a state of the electric contacts of the switch unit 14 to identify whether the mating input and output interface unit 20 or the like is a legitimate unit.

The connector 32 on the input and output interface unit 20 side includes terminals of a power line 21, a ground 22, and a control line 23. The power control switch 16 is a switch that can be turned on and off by the microcomputer 11, and is used for switching on and off for a power supplied from the zone ECU 10 to the input and output interface unit 20 side.

Figure 2:
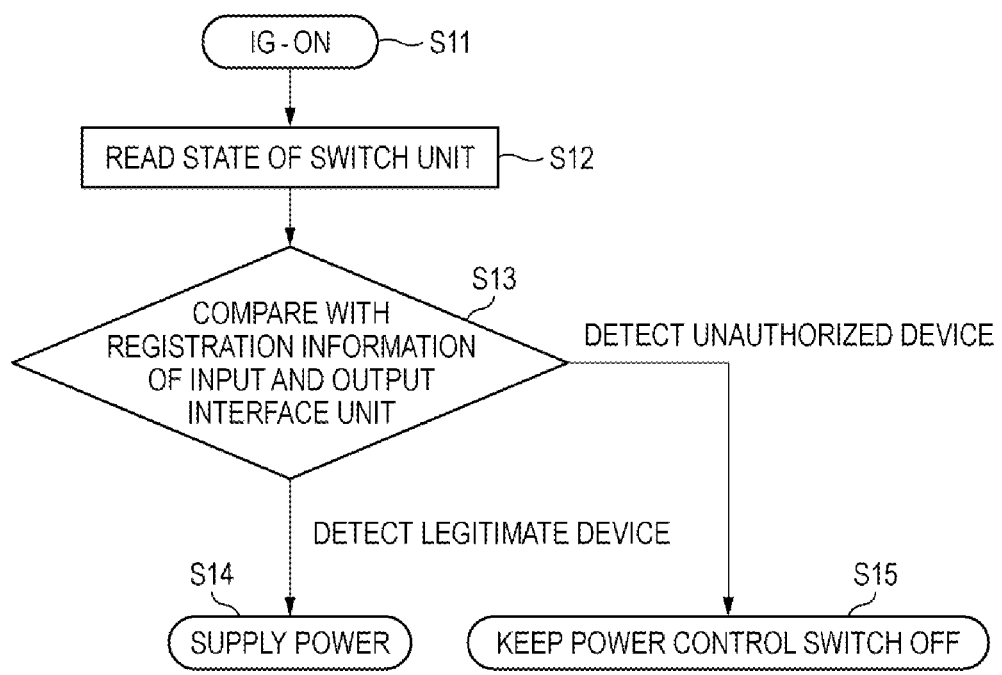
FIG. 2 is a flowchart showing a main operation example of a zone ECU.

FIG. 2 is a flowchart showing a main operation example of the zone ECU 10. Control in FIG. 2 is performed by the microcomputer 11 in the zone ECU 10. Operations in FIG. 2 will be described below.

When ignition (IG) of the vehicle is turned on, the microcomputer 11 executes Step S11 of the operations shown in FIG. 2. The microcomputer 11 reads an on or off state of each contact of the switch unit 14 in S12. The zone ECU 10 holds in advance information unique to the input and output interface unit 20 or the like that may be connected to the zone ECU 10 in an internal non-volatile memory as predetermined registration information. In S13, the microcomputer 11 compares the registration information of the input and output interface unit 20 held by the non-volatile memory with the on or off state of the switch unit 14 read in S12.

If there is registration information that matches the on or off state of the switch unit 14, the microcomputer 11 identifies the mating unit as a legitimate device and proceeds from S13 to S14. Then, the power control switch 16 is switched on to supply power to the input and output interface unit 20 (S14).

If there is no registration information that matches the on or off state of the switch unit 14, the microcomputer 11 identifies the mating unit as an unauthorized device and proceeds from S13 to S15. Then, the power control switch 16 is kept to be off. Therefore, in this case, no power is supplied to the mating unit connected to the connector 31 (S15).

Regarding the registration information on the zone ECU 10, it is assumed that the latest information is added or updated and registered in the zone ECU 10 as needed, using, for example, a vehicle diagnostic tester installed at a vehicle dealer, or the Over The Air (OTA) technique.

Figure 3:
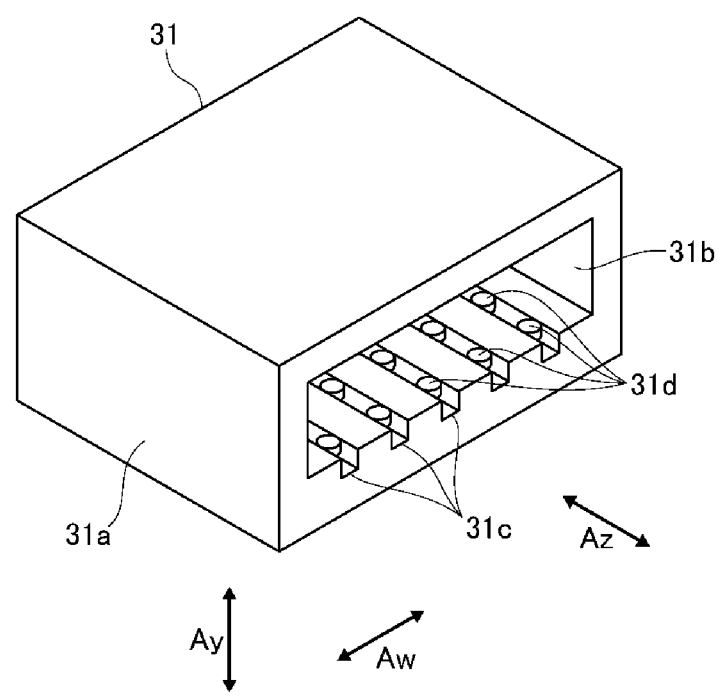
FIG. 3 is a perspective view showing external appearance of a connector on a male side.
Figure 4:
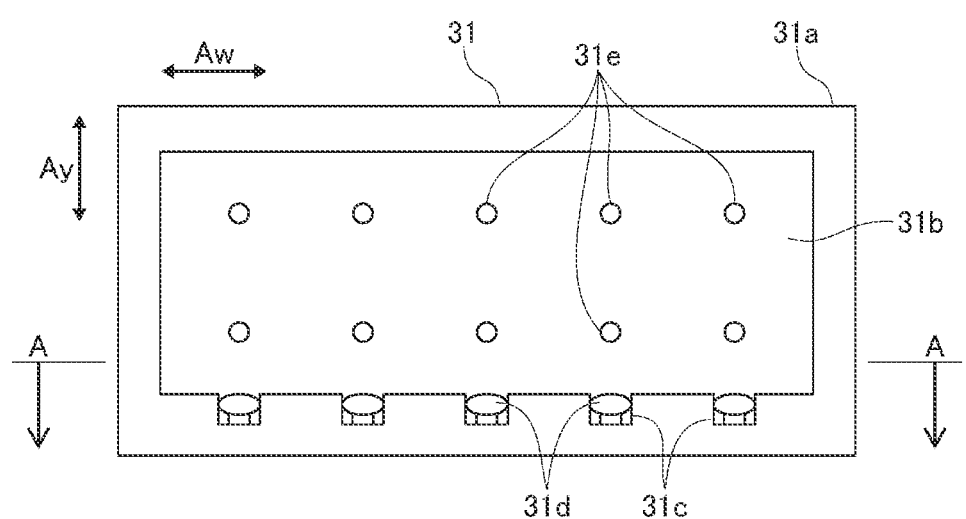
FIG. 4 is a front view showing the connector on the male side.
Figure 5:
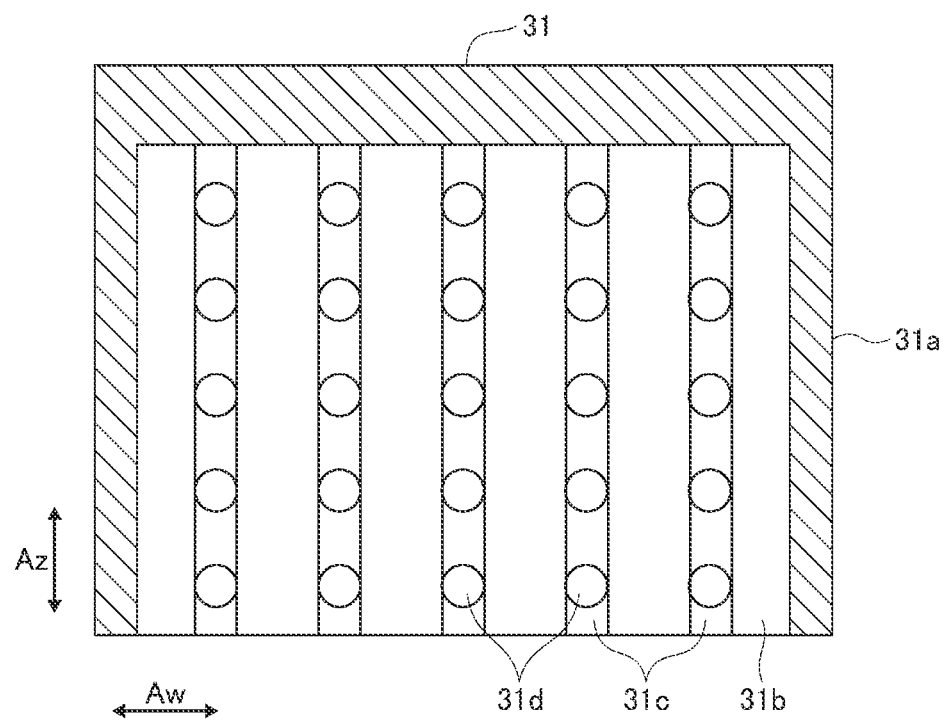
FIG. 5 is a cross-sectional diagram of a cross section taken along a line A-A in FIG. 4.

FIG. 3 is a perspective view showing external appearance of the connector 31 on a male side. FIG. 4 is a front view showing the connector 31 on the male side. FIG. 5 is a cross-sectional diagram of across section taken along a line A-A in FIG. 4. In FIG. 3, a terminal 31e is omitted in order to make it easier to see a characteristic portion.

As shown in FIGS. 3 to 5, a connector housing 31a of the connector 31 is formed with an opening 31b for inserting the mating connector 32. As shown in FIG. 4, ten pin-shaped terminals 31e are arranged in the opening 31b.

As shown in FIGS. 3 to 5, on a bottom inner wall of the connector housing 31a, five rows of grooves 31c elongated from the opening 31b and extending toward an insertion and extraction direction (a moving direction of the connectors when they are being attached to each other) Az are formed in parallel with each other. A plurality of tact switches 31d are provided in each groove 31c. A button capable of moving in a height direction Ay is formed on a top portion of each tact switch 31d. An internal electric contact of each tact switch 31d is turned off in a released state, and the electric contact is turned on only when the button is pressed. Each button is arranged inside the groove 31c, and a top portion thereof is formed in a curved surface shape so as not to hinder movement of a mating protrusion.

Although not shown in FIGS. 3 to 5, a plurality of electric wires for connecting the electric contacts in each terminal 31e and each tact switch 31d are arranged on a back side of the connector 31. These electric wires are connected to an electric circuit in the zone ECU 10 shown in FIG. 1.

The grooves 31c are formed at predetermined positions, for example, at a predetermined interval from each other. The plurality of tact switches 31d are arranged at predetermined positions in the groove 31c, for example, at a predetermined interval from each other. The plurality of tact switches 31d form the switch unit 14 in FIG. 1.

Figure 6:
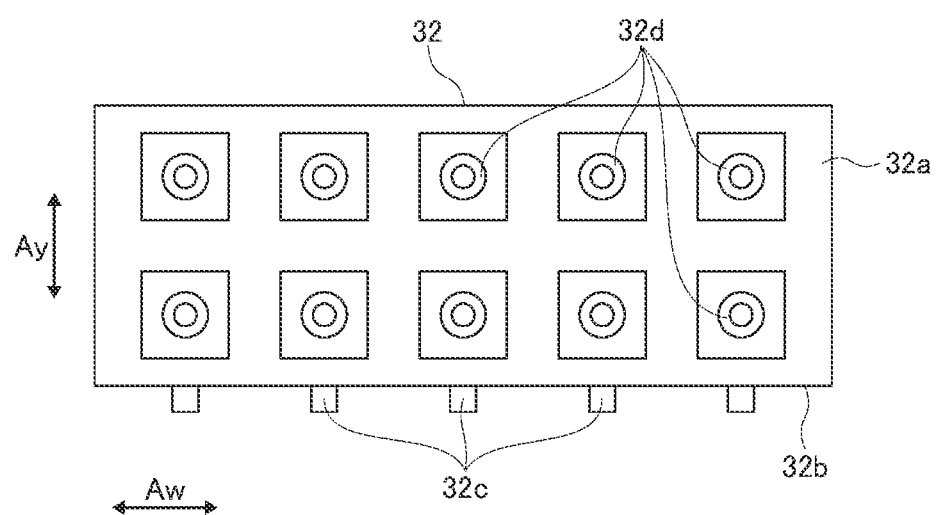
FIG. 6 is a front view showing a connector on a female side.
Figure 7:
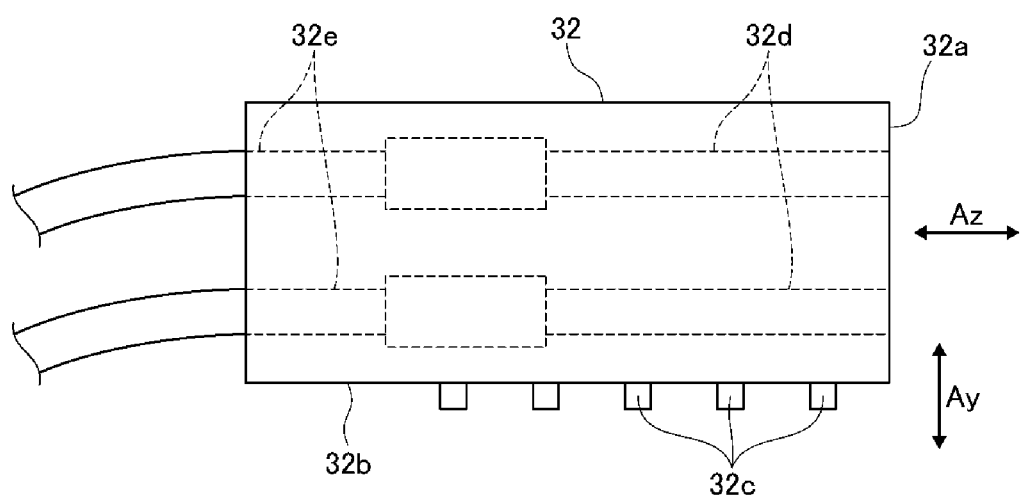
FIG. 7 is a side view showing the connector on the female side.

FIG. 6 is a front view showing the connector 32 on a female side. FIG. 7 is a side view showing the connector 32 on the female side.

Outer shape and size of a connector housing 32a of the connector 32 shown in FIGS. 6 and 7 are formed so as to substantially match the opening 31b of the connector 31 shown in FIGS. 3 to 5. Therefore, the connector housing 32a of the connector 32 can be inserted and fitted into the opening 31b of the connector 31.

As shown in FIG. 6, the connector housing 32a includes 10 terminals 32d inside. Each terminal 32d includes a recess that can accept the pin-shaped terminal 31e on the male side, and is arranged at a position facing each terminal 31e on the male side.

As shown in FIG. 7, an electric wire 32e is connected to each terminal 32d in the connector housing 32a. These electric wires 32e are connected to the electric circuit in the input and output interface unit 20 shown in FIG. 1.

A plurality of downward protrusions 32c are formed on a bottom surface 32b of the connector housing 32a. These protrusions 32c are arranged at positions matching positions of the grooves 31c and arrangement positions of the tact switches 31d of the connector 31 on the male side. That is, with the connectors 31 and 32 fitted to each other, each protrusion 32c is arranged so as to press the button of any one or more tact switches 31d. When the connector housings 31a and 32a move relative to each other in the insertion and extraction direction Az, since each protrusion 32c passes through the groove 31c, movement of the protrusions 32c is not interfered.

A total number of the plurality of protrusions 32c actually provided in the connector housing 32a, a position where each protrusion 32c is arranged, and a length of each protrusion 32c are appropriately determined according to design specifications of the input and output interface unit 20. For example, by setting the total number and arrangement positions of the protrusions 32c to a predetermined state for each type of the input and output interface unit 20, the type of the input and output interface unit 20 can be expressed by differences in arrangement states of the protrusions 32c.

As described above, in the zone ECU 10 shown in FIG. 1, by reading the state of the switch unit 14 in S12 of FIG. 2, the microcomputer 11 can detect the arrangement states of the protrusions 32c in the connector 32 on the input and output interface unit 20 side. As for the legitimate input and output interface unit 20, the arrangement states of the protrusions 32c are determined in advance, and thus are held in advance on the zone ECU 10 as the registration information. Therefore, by comparing the information read by the microcomputer 11 in S12 with the registration information in S13, it is possible to identify whether or not the input and output interface unit 20 actually connected is an unauthorized unit, and it is also possible to identify a type of the legitimate unit.

Figure 8:
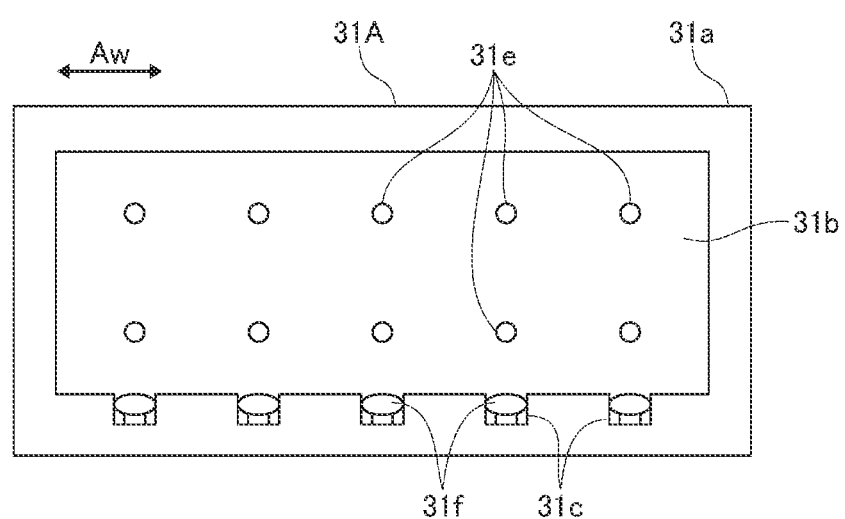
FIG. 8 is a front view showing a connector on a male side in a modified example.
Figure 9:
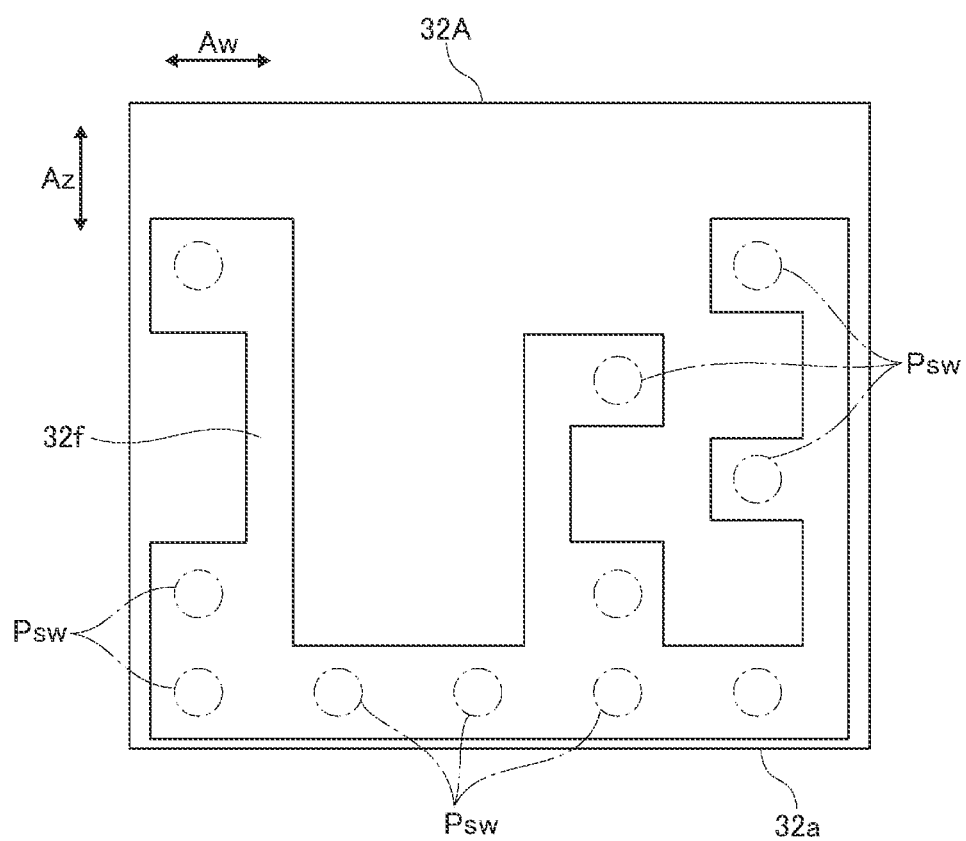
FIG. 9 is a bottom view showing a connector on a female side in the modified example.
Figure 10:
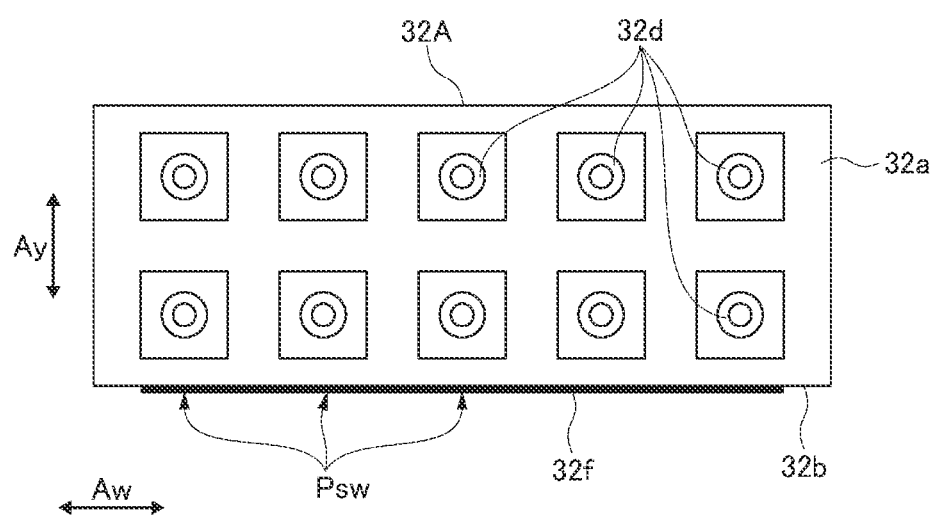
FIG. 10 is a front view showing the connector on the female side in the modified example.
Figure 11:
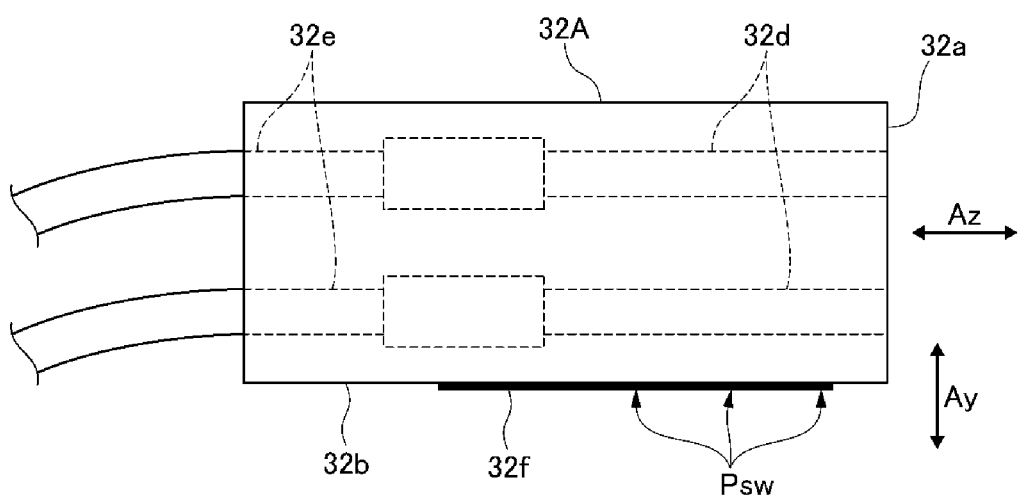
FIG. 11 is a side view showing the connector on the female side in the modified example.

When configuring the unauthorized connection detecting device 100 shown in FIG. 1, as a modified example, a connector 31A shown in FIG. 8 and a connector 32A shown in FIGS. 9 to 11 can be adopted instead of the connectors 31 and 32. The configurations and overall operation of the unauthorized connection detecting device 100 other than the connectors 31A and 32A are the same as those in the above-described embodiment.

FIG. 8 is a front view showing the connector 31A on a male side in the modified example. The connector 31A shown in FIG. 8 includes the connector housing 31a, the opening 31b, the grooves 31c, and the terminals 31e, as in the case of the connector 31.

A plurality of switch terminals 31f are arranged in place of the tact switches 31d described above in the grooves 31c of the connector 31A. Each switch terminal 31f is a conductive terminal capable of forming an electric contact by facing and contacting a conductor pattern 32f described later.

In the modified example, in order to achieve a stable contact pressure with the opposing conductor pattern 32f, each switch terminal 31f is configured by using an elastic metal such as a spring. Therefore, each switch terminal 31f is deformable, and a position of a top portion of the switch terminal 31f can be displaced in the height direction Ay. The switch terminals 31f are arranged so as not to hinder the relative movement of the connector housings 31a and 32a in the insertion and extraction direction Az. That is, the top portion of the switch terminal 31f is shaped so as not to protrude significantly from the groove 31c.

FIG. 9 is a bottom view showing the connector 32A on a female side in the modified example. FIG. 10 is a front view showing the connector 32A on the female side in the modified example. FIG. 11 is aside view showing the connector 32A on the female side in the modified example.

The connector 32A shown in FIGS. 9 to 11 includes the connector housing 32a, the bottom surface 32b, and the terminals 32d, as in the case of the connector 32.

For example, a planar conductor pattern 32f as shown in FIG. 9 is attached to a part of the bottom surface 32b of the connector housing 32a. The conductor pattern 32f is made of a thin metal such as a copper foil, and a surface thereof contacts each switch terminal 31f on the opposing connector 31A side to form an electric contact.

Actually, the electric contact is formed at each of a plurality of contact portions Psw shown in FIG. 9. That is, since each switch terminal 31f on the connector 31A side exists at a position facing each contact portion Psw in FIG. 9, at the position of each contact portion Psw on the connector 32A, the top portion of the switch terminal 31f and a surface of the conductor pattern 32f are in contact with each other to form an electric contact.

The plurality of electric contacts formed by each switch terminal 31f and the conductor pattern 32f can be used as they are as the switch unit 14 in FIG. 1. For example, if the conductor pattern 32f is connected to the ground 22, when each electric contact formed by the switch terminal 31f and the conductor pattern 32f is closed, a potential of one input port of the microcomputer 11 can be lowered to a potential of the ground 13.

Even when the conductor pattern 32*f* is open on the connector 32A side, if the switch terminals 31*f* of one or more common parts are always connected to the ground 13, the potential of the input port of the microcomputer 11 can be lowered to the potential of the ground 13 via the electric contacts formed by the plurality of switch terminals 31*f* and the conductor pattern 32*f*.

As described above, according to the unauthorized connection detecting device 100 shown in FIG. 1, even if the input and output interface unit 20 side does not include a CPU or a communication line, it is possible to reliably identify whether or not the mating device connected to the connector 31 is an unauthorized device. Moreover, since the electric signal output from the switch unit 14 can be directly read by the microcomputer 11, unauthorized connection can be detected at a low cost with no need to prepare a special reader device.

By the microcomputer 11 performing the operations shown in FIG. 2, since no power is supplied to the unauthorized device, it is possible to prevent the zone ECU 10 side from being affected by the unauthorized device.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

According to an aspect of the embodiments described above, an unauthorized connection detecting device (100) configured to detect an unauthorized device connection at a connection part (30) at which an electronic control unit (10) mounted on a vehicle and an input and output unit (20) are connected to each other is provided. The unauthorized connection detecting device (100) includes a first connector (31) mounted on the electronic control unit (10) and a second connector (32) mounted on the input and output unit (20), the first and second connectors being configured to be attached to each other, a protrusion (32*c*) formed on the second connector (32), a switch unit (31*d*) arranged on the first connector (31) and configured to, when the first and second connectors are attached to each other, detect the protrusion (32*c*) and an unauthorized connection identification unit (11) configured to detect an unauthorized connection based on a state detected by the switch unit (31*d*).

According to the unauthorized connection detecting device having a configuration as described above, when a legitimate device is connected with the pair of connectors fitted to each other, the switch unit can detect the mating protrusion in a predetermined state. However, when an unauthorized device is connected, the switch unit cannot detect the mating protrusion in a normal state. Therefore, the unauthorized connection identification unit can detect the unauthorized connection based on the detection state of the switch unit. Moreover, since the state of the mating protrusion can be detected only by the switch unit with no need to prepare a special reader, cost increase of the ECU can be prevented and the unauthorized connection of devices having no communication function can be dealt with.

The first connector (31) may include a plurality of rows of grooves (31*c*) extending in a moving direction (Az) of the first and second connectors (31, 32) when the first and second connectors (31, 32) are being attached to each other. The switch unit (31*d*) may be arranged in one of the grooves. The protrusion (32*c*) may be formed at a position on the second connector (32) such that the protrusion (32*c*) passes through the one of the grooves (31*c*) when the first and second connectors (31, 32) are being attached to each other.

With this configuration, since the protrusion is formed at a position where it is enabled to pass through the groove, it is possible to prevent the protrusion from hindering the insertion and removal of the pair of connectors, and it is possible to prevent occurrence of malfunction due to deformation of the protrusion and the like.

According to another aspect of the embodiments described above, an unauthorized connection detecting device configured to detect an unauthorized device connection at a connection part (30) at which an electronic control unit (10) mounted on a vehicle and an input and output unit (20) are connected to each other, the unauthorized connection detecting device includes a third connector (31A) mounted on the electronic control unit (10) and a fourth connector (32A) mounted on the input and output unit (20), the third and fourth connectors being configured to be attached to each other, a conductor pattern (32*f*) formed on the fourth connector (32A), a conductor connection detecting unit (31*f*) arranged on the third connector (31A) and configured to be electrically connected to the conductor pattern (32*f*) and an unauthorized connection identification unit (11) configured to detect an unauthorized connection based on a state detected by the conductor connection detecting unit (31*f*).

According to the unauthorized connection detecting device having a configuration as described above, if a legitimate device is connected with the pair of connectors fitted to each other, the conductor connection detecting unit can detect conduction of an electric circuit by the mating conductor pattern in a predetermined state. However, when an unauthorized device is connected, the conductor connection detecting unit cannot detect the conduction of the electric circuit by the mating conductor pattern in a normal state. Therefore, the unauthorized connection identification unit can detect the unauthorized connection based on the detection state of the conductor connection detecting unit. Moreover, since the state of the mating conductor pattern can be detected only by the conductor connection detecting unit with no need to prepare a special reader, cost increase of the ECU can be prevented and the unauthorized connection of devices having no communication function can be dealt with.

The third connector (31A) may include a plurality of rows of grooves (31*c*) extending in a moving direction (Az) of the third and fourth connectors (31A, 32A) when the third and fourth connectors (31A, 32A) are being attached to each other. The conductor connection detecting unit (31*f*) may be arranged in one of the grooves. The conductor pattern (32*f*) may be formed at a position (Psw) on the fourth connector (32A) at which the conductor pattern (32*f*) faces at least a part of the one of the grooves when the third and fourth connectors (31A, 32A) are attached to each other.

With this configuration, since the conductor connection detecting unit is arranged in the groove, for example, the conductor connection detecting unit can be deformably configured by using a conductive spring or the like. That is, since a position of the electric contact can be displaced in a depth direction of the groove, a good electric connection at the contact can be achieved. It is possible to prevent the conductor pattern and the conductor connection detecting unit from hindering the insertion and removal of the pair of connectors.

The electronic control unit may be a zone management unit (10) configured to manage a predetermined zone in the vehicle. The electronic control unit may be configured to supply power to the input and output unit (20) connected to the zone management unit (10) only when no unauthorized connection is detected by the unauthorized connection identification unit (S13 to S15).

With this configuration, since no power is supplied to the unauthorized device, it is possible to reliably prevent an electric circuit of the unauthorized connected device from adversely affecting the vehicle side. The zone managed by the zone management unit can be reliably protected from the unauthorized device connection.

What is claimed is:

1. An unauthorized connection detecting device configured to detect an unauthorized device connection at a connection part at which an electronic control unit mounted on a vehicle and an input and output unit are connected to each other, the unauthorized connection detecting device comprising:
   a first connector mounted on the electronic control unit and a second connector mounted on the input and output unit, the first and second connectors being configured to be attached to each other;
   a protrusion formed on the second connector;
   a plurality of switches arranged inside the first connector, a respective one of the switches is configured to, when the first and second connectors are attached to each other, detect the protrusion when the protrusion is aligned with the respective one of the switches; and
   an unauthorized connection identification unit configured to detect an unauthorized connection based on a state detected by the plurality of switches, wherein
   the plurality of switches includes:
   a plurality of first switches aligned with each other in a moving direction of the first and second connectors when the first and second connectors are being attached to each other, the first switches are spaced away from each other in the moving direction, and
   a plurality of second switches aligned with each other in the moving direction, the second switches are spaced away from each other in the moving direction and spaced away from each of the first switches in a second direction orthogonal to the moving direction;
   wherein
   the first connector includes a plurality of rows of grooves extending in the moving direction of the first and second connectors when the first and second connectors are being attached to each other, the plurality of rows of grooves includes a first groove, and a second groove spaced away from the first groove in the second direction,
   the plurality of first switches are arranged in the first groove, and the plurality of second switches are arranged in the second groove, and
   the protrusion is formed at a position on the second connector such that the protrusion passes through the one of the first groove and the second groove when the first and second connectors are being attached to each other.

2. The unauthorized connection detecting device according to claim 1, wherein the electronic control unit is a zone management unit configured to manage a predetermined zone in the vehicle, and the electronic control unit is configured to supply power to the input and output unit connected to the zone management unit only when no unauthorized connection is detected by the unauthorized connection identification unit.

3. The unauthorized connection detecting device according to claim 1, further comprising:
   a power line; and a power control switch connected between the power line and the first connector, the power control switch having an ON state and an OFF state, the power control switch connects the input and output unit to the power line when the power control switch is in the ON state and disconnects the input and output unit from the power line when the power control switch is in the OFF state,
   wherein the electronic controller unit causes the power control switch to be in the OFF state when the authorized connector identification unit detects the unauthorized connection and causes the power control switch to be in the ON state when the authorized connector identification unit does not detect the unauthorized connection.

4. An unauthorized connection detecting device configured to detect an unauthorized device connection at a connection part at which an electronic control unit mounted on a vehicle and an input and output unit are connected to each other, the unauthorized connection detecting device comprising:
   a third connector mounted on the electronic control unit and a fourth connector mounted on the input and output unit, the third and fourth connectors being configured to be attached to each other;
   a conductor pattern formed on the fourth connector;
   a conductor connection detecting unit arranged on the third connector and configured to be electrically connected to the conductor pattern; and
   an unauthorized connection identification unit configured to detect an unauthorized connection based on a state detected by the conductor connection detecting unit,
   wherein the conductor connection detecting unit is a plurality of switch terminals and each of the plurality of switch terminals is a conductive terminal capable of forming an electric contact by facing and contacting the conductor pattern,
   wherein
   the plurality of switch terminals includes:
   a plurality of first switch terminals aligned with each other in a moving direction of the third and fourth connectors when the third and fourth connectors are being attached to each other, the first switch terminals are spaced away from each other in the moving direction, and
   a plurality of second switch terminals aligned with each other in the moving direction, the second switch terminals are spaced away from each other in the moving direction and spaced away from each of the first switch terminals in a second direction orthogonal to the moving direction;
   the third connector includes a plurality of rows of grooves extending in the moving direction of the third and fourth connectors when the third and fourth connectors are being attached to each other, the plurality of rows of grooves includes a first groove, and a second groove spaced away from the first groove in the second direction,
   the plurality of first switch terminals are arranged in the first groove, and the plurality of second switch terminals are arranged in the second groove, and
   the conductor pattern is formed at a position on the fourth connector such that the first switch terminals and the second switch terminals contact the conductor pattern when the third and fourth connectors are attached to each other.

5. The unauthorized connection detecting device according to claim 4, wherein the electronic control unit is a zone management unit configured to manage a predetermined zone in the vehicle, and the electronic control unit is configured to supply power to the input and output unit connected to the zone management unit only when no unauthorized connection is detected by the unauthorized connection identification unit.

6. The unauthorized connection detecting device according to claim 4, wherein the fourth connector includes a housing having an outside surface, the conductor pattern is located on the outside surface of the housing, and the conductor connection detecting unit contacts the conductor pattern when the fourth connector is attached to the third connector.

\* \* \* \* \*